M. A. YEAKLEY.
TROLLEY RETRIEVER.
APPLICATION FILED OCT. 11, 1909.
1,143,875. Patented June 22, 1915.
6 SHEETS—SHEET 1.
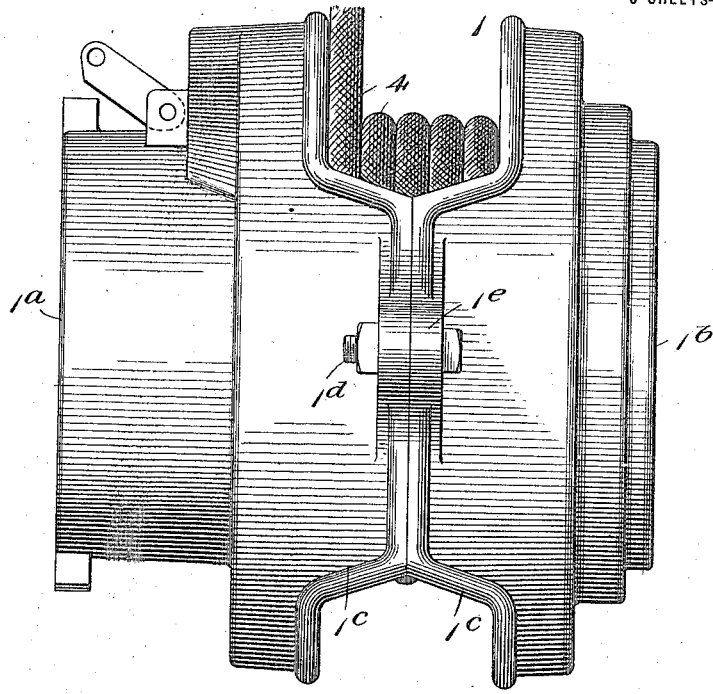
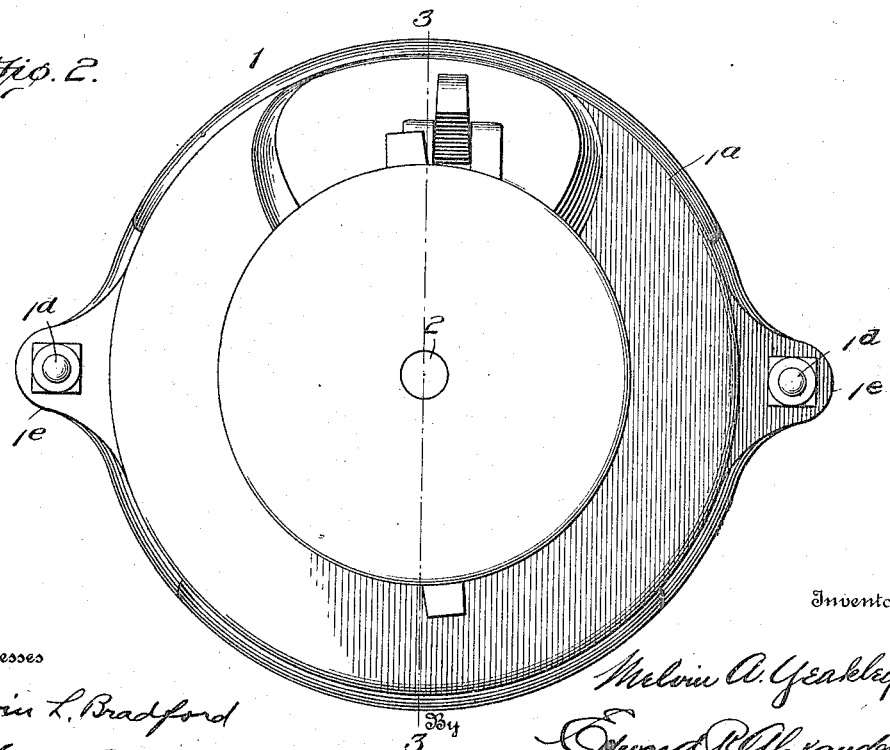

M. A. YEAKLEY.
TROLLEY RETRIEVER.
APPLICATION FILED OCT. 11, 1909.

1,143,875.

Patented June 22, 1915.
6 SHEETS—SHEET 2.

Witnesses
Edwin L. Bradford
Geo. B. Pitts

Inventor
Melvin A. Yeakley
By Edward R. Alexander
Attorney

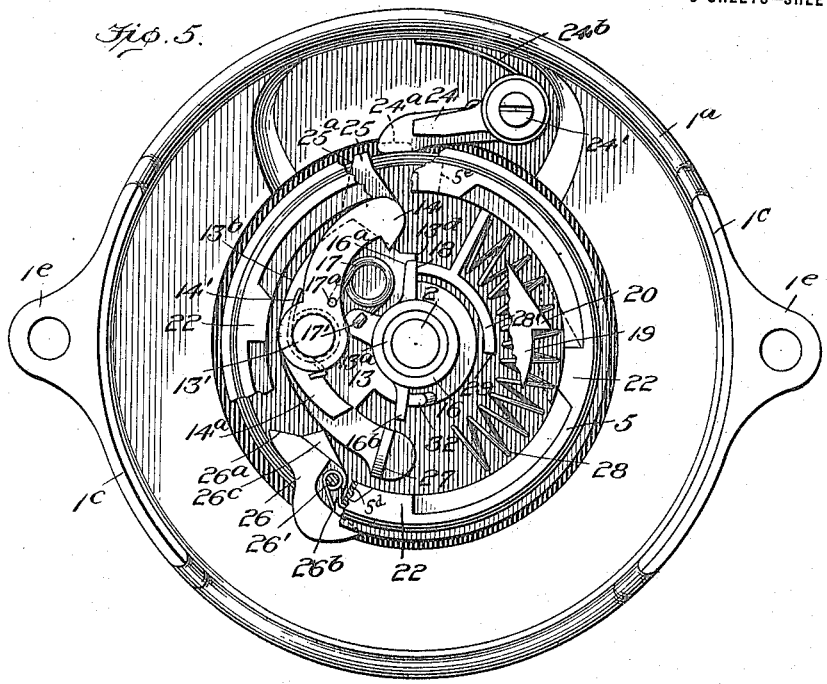

M. A. YEAKLEY.
TROLLEY RETRIEVER.
APPLICATION FILED OCT. 11, 1909.

1,143,875.

Patented June 22, 1915.
6 SHEETS—SHEET 4.

Witnesses
Edwin L. Bradford
Geo. B. Pitts

Inventor
Melvin A. Yeakley
By Edward L. Alexander
Attorney

M. A. YEAKLEY.
TROLLEY RETRIEVER.
APPLICATION FILED OCT. 11, 1909.
1,143,875.
Patented June 22, 1915.
6 SHEETS—SHEET 5.
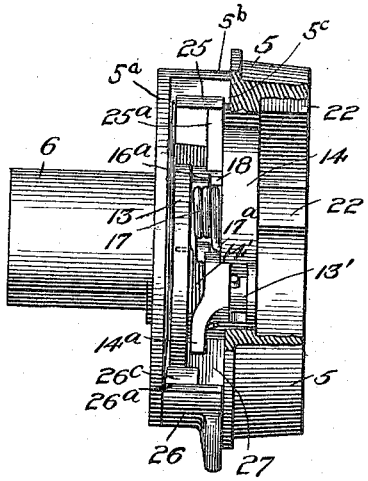
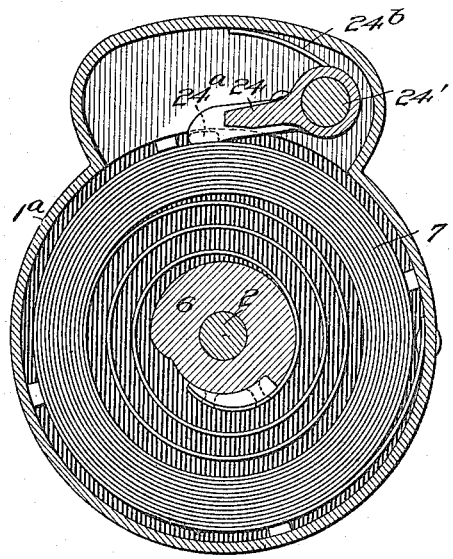
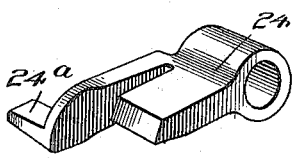
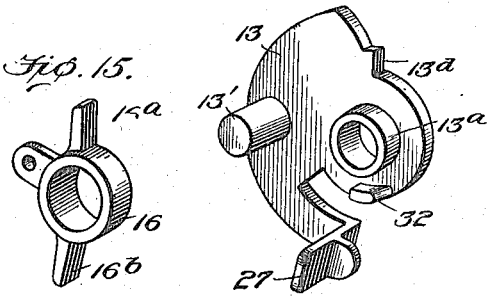
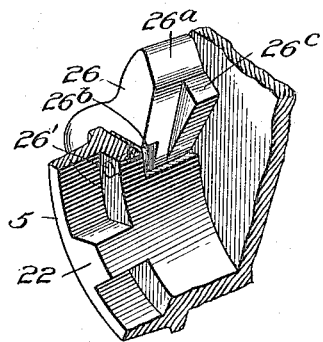

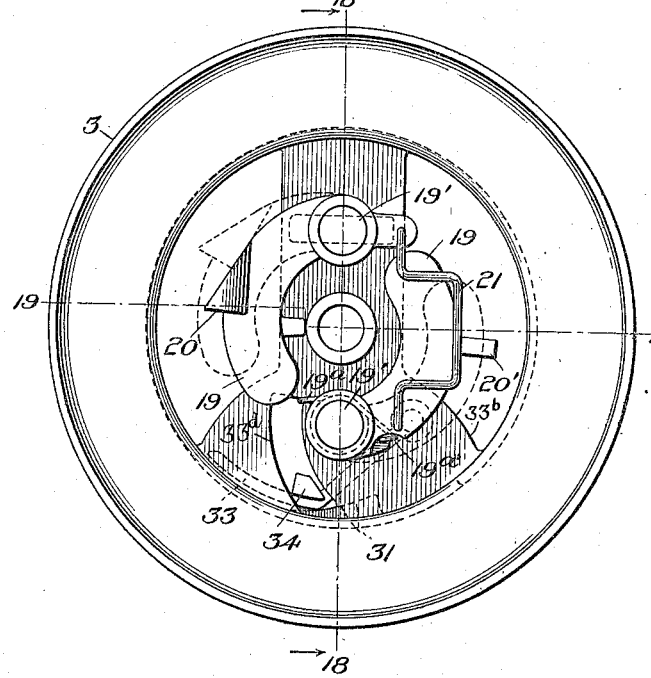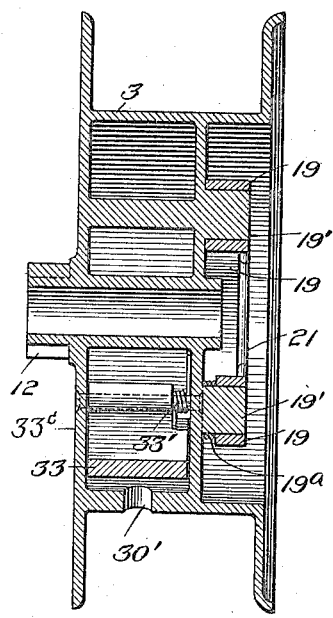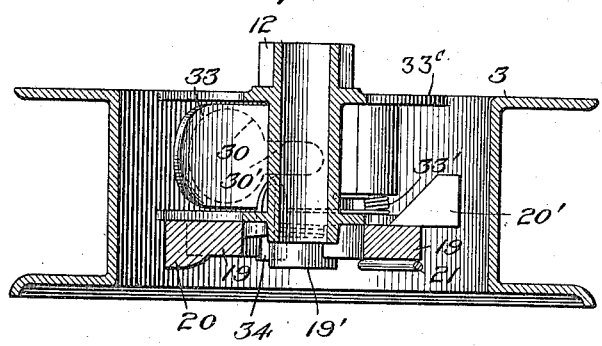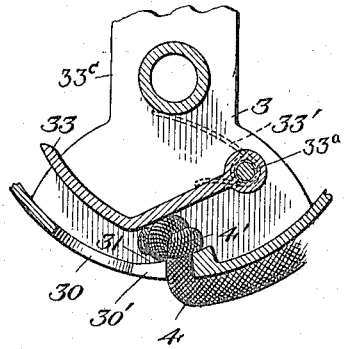

UNITED STATES PATENT OFFICE.

MELVIN A. YEAKLEY, OF CANTON, OHIO, ASSIGNOR TO JOHN E. McLAIN, OF CANTON, OHIO.

TROLLEY-RETRIEVER.

1,143,875.

Specification of Letters Patent.

Patented June 22, 1915.

Application filed October 11, 1909. Serial No. 522,033.

*To all whom it may concern:*

Be it known that I, MELVIN A. YEAKLEY, a citizen of the United States, residing at Canton, in the county of Stark and State of Ohio, have invented certain new and useful Improvements in and Relating to Trolley-Retrievers, of which the following is a specification.

This invention relates to a retriever adapted to automatically control the trolley pole of a car and its cord.

One object of the invention is to provide a winding drum normally connected through low power connections with a power spring, adapted to absorb the slack in the trolley rope, but to automatically connect the drum through high power connections with the power spring as soon as the trolley leaves the overhead wire or conductor, thus causing a retrieving of the trolley pole by the winding of its cord about the drum. By the term "low power connections" I mean mechanism, such as differential or back gearing between the power spring driven member and the drum, to accelerate the speed of the drum relative to said driven member, whereby the force operating to rotate the drum is only sufficient to take up the slack occurring at any time in the trolley rope; while by the term "high power connections" I mean such connections between the power spring driven member and the drum which permit the full force of the power spring to be utilized in rotating the drum, whereby the trolley will be retrieved.

Another object of the invention is to simplify the construction and operation of the retriever, shown, described and claimed in an application filed by me on the 7th day of October, 1907, Ser. No. 396,243.

Further objects of the invention comprise the combination or combinations of parts hereinafter described and claimed.

For the purposes of illustration, I have, in the accompanying drawings, shown and herein described one form of trolley retriever embodying my invention.

Figure 3:
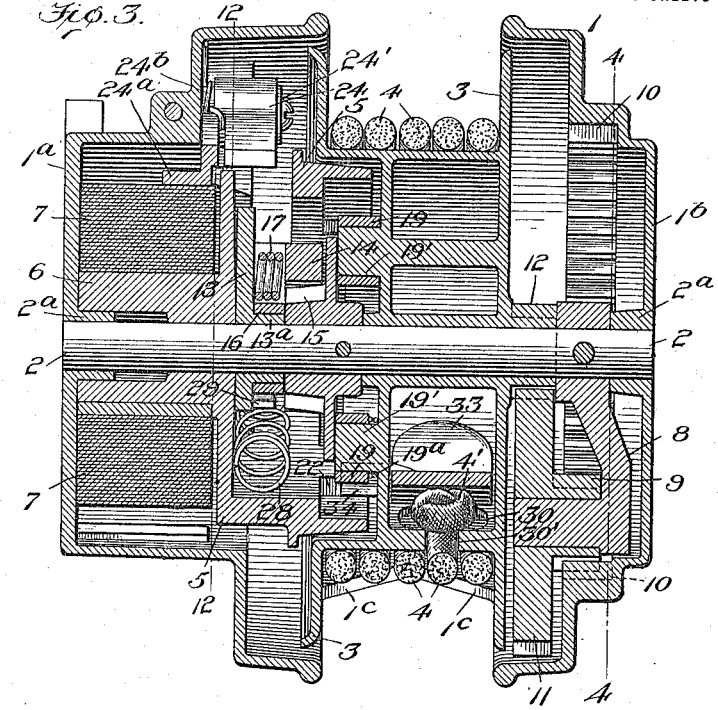
Figure 4:
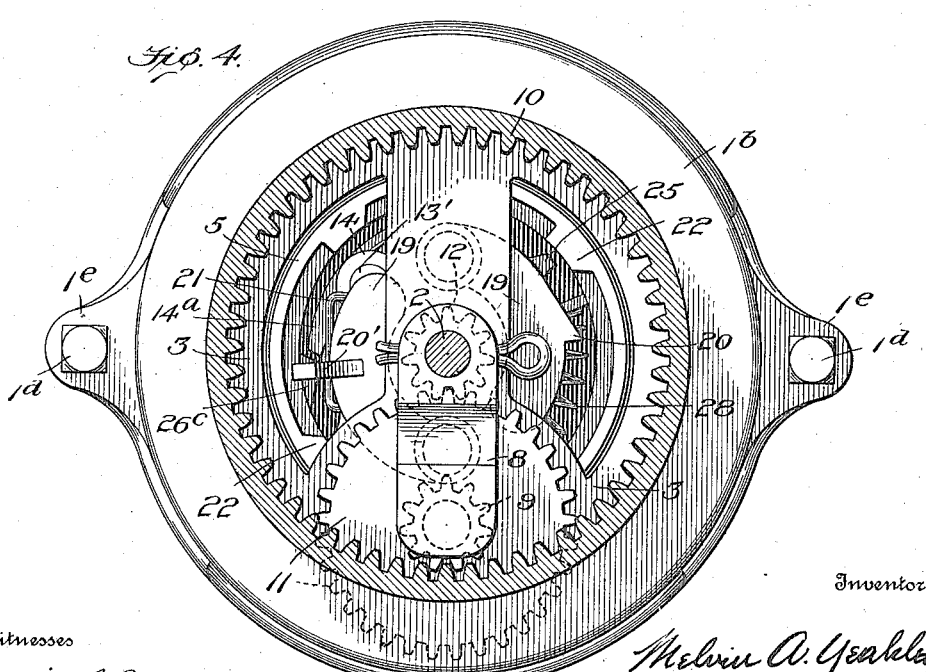
Figure 7:
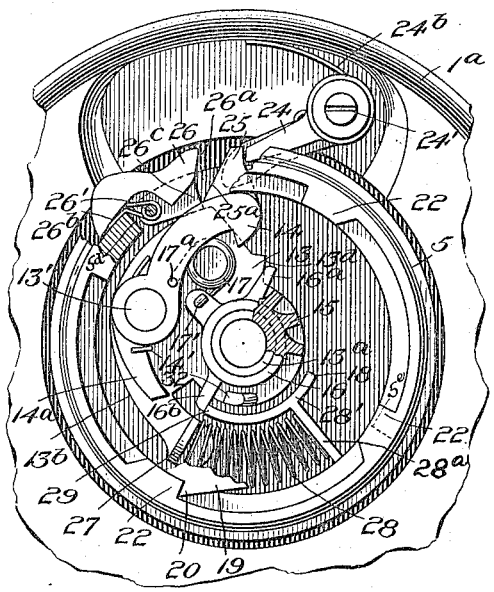
Figure 8:
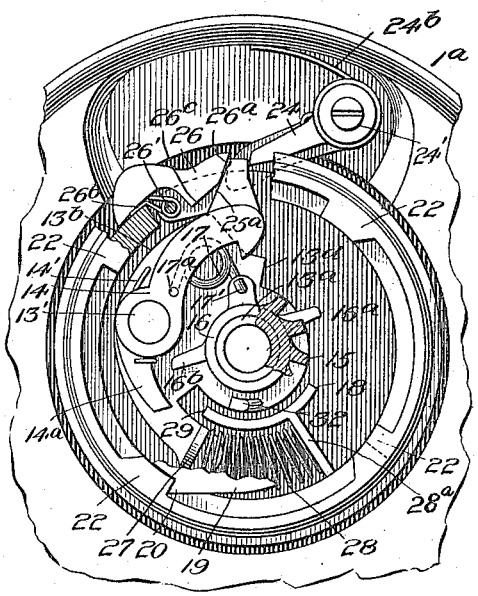
Figure 9:
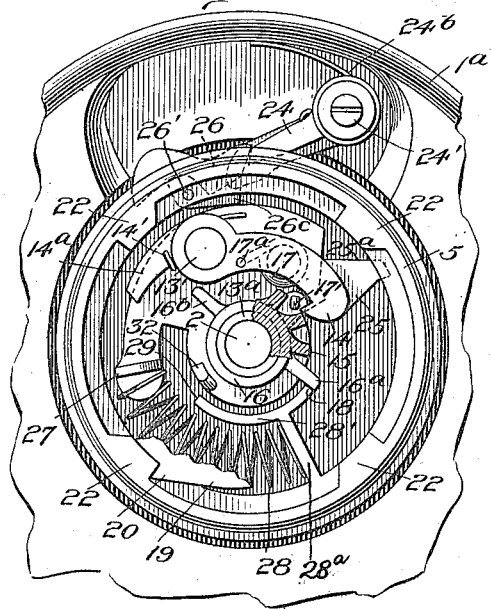
Figure 10:
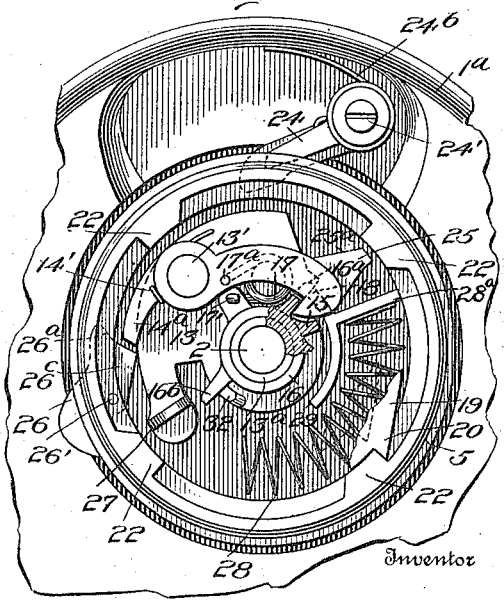

Referring to the drawings Figure 1 is a side elevation of a retriever embodying my invention. Fig. 2 is a rear elevation of the same. Fig. 3 is a transverse sectional view on the line 3—3, Fig. 2. Fig. 4 is a section on line 4—4, Fig. 3, looking toward the left thereof. Fig. 5 is a sectional view on the line 5—5 of Fig. 3, looking toward the left thereof, the drum and the parts carried thereby, except a portion of one of the centrifugal dogs, to indicate its position relative to other parts shown, and one casing member and the parts inclosed therein, being omitted; this view showing the position of certain parts of the retriever after they have been assembled and before the attachment of the trolley cord to the retriever drum and the winding of the power spring. Fig. 6 is a view similar to Fig. 5 showing the position of the parts at the time when the drum is about to be connected through the low power connections with the power spring. Figs. 7, 8, and 9 are views similar to Figs. 5 and 6 showing the same parts in different positions during the operation of connecting the drum through the low power connections. Fig. 10 is a view similar to Fig. 5 showing the position of the parts when the low power connections are complete. Fig. 11 is a side elevation of the driver and accommodator, parts of the driver being broken away. Fig. 12 is a section on the line 12—12 of Fig. 3 looking toward the left, showing the power spring unwound. Fig. 13 is a perspective view of the re-winding or limiting pawl. Fig. 14 is a perspective view of the accommodator. Fig. 15 is a perspective view of the spring lock or shifter. Fig. 16 is a fragmentary view of the driver, showing the stop pawl. Fig. 17 is an elevation of the winding drum and centrifugal dogs carried thereby. Fig. 18 is a transverse section of the drum on line 18—18 of Fig. 17. Fig. 19 is a transverse section of the drum on line 19—19 of Fig. 17 looking downwardly. Fig. 20 is a fragmentary section of the drum.

In the drawings, 1 indicates a casing preferably comprising two members 1ª, 1ᵇ. The casing members are provided with interlocking flanges 1ᶜ, 1ᶜ, for spacing the said members apart. Each of the flanges carries projection members 1ᵉ through which bolts 1ᵈ extend and hold the casing members 1ª, 1ᵇ, together. The casing members 1ª, 1ᵇ, are adapted to inclose the retriever mechanism and power spring.

2 indicates a shaft rotatably mounted in suitable bearings 2ª, 2ª, carried, respectively, by the casing members 1ª, 1ᵇ.

3 indicates a drum, loosely mounted upon the shaft 2, and adapted to be rotated, as will be hereinafter described, to wind a trolley cord 4 thereon. As viewed in Figs. 4 to 10 the drum is rotated by the power spring in an anti-clockwise direction to wind the rope thereon, and in the opposite, or a clockwise direction when the rope is unwound from said drum. The trolley cord 4 may be connected to the trolley pole (not shown) of the car in a well known manner.

5 indicates a driver having a hub 6 loosely sleeved on the shaft 2. The driver preferably comprises a disk $5^a$, having an integral peripheral wall $5^b$ extending from that face opposite to the hub 6.

$5^c$ indicates a circumferential slot formed in the wall $5^b$. The slot extends approximately one-half the circumference of the wall $5^b$, from the end wall indicated at $5^d$ to the end wall (see dotted lines Fig. 5) indicated at $5^e$.

7 indicates a power spring having one end attached to the casing $1^a$ and its opposite end connected to the hub 6 and operating when wound to continuously exert its power to rotate the said driver 5 in an anti-clockwise direction, as viewed in Figs. 4 to 10.

8 indicates an arm keyed on the shaft 2, preferably on that side of the drum opposite to the power spring 7, and carrying a pinion 9 that meshes with a stationary gear 10. This gear 10 is preferably formed integral with the casing $1^b$, as shown in the drawings.

11 indicates a gear, preferably formed integral with the pinion 9.

12 indicates a pinion fixed to the drum 3 and engaged by the gear 11.

By connecting the driver with the shaft 2, as hereinafter to be described, it will be understood that, through the train of gears 9, 10, 11, 12, the rotation of the drum is accelerated relative to the rotation of the shaft 2, preferably in ratio of sixteen to one, thereby placing the drum in what may be termed low power connection with the power spring 7. When thus connected, the tension of the spring upon the drum in the rope winding direction is sufficient to absorb only the slack in the trolley cord 4 during the up and down normal movement of the trolley pole, relative to the top of the car, as it runs along the trolley wire, and is not strong enough to effect a retrieving or pulling down of the pole. When, however, the trolley pole jumps the wire, there is a sudden up movement of or jerk on the cord 4, which movement or jerk throws in automatically actuated direct connections between the drum 3 and the driver 5 and simultaneously disconnects the low power or indirect connecting means between the driver 5 and shaft 2. When this operation takes place, the drum 3 is in high power connection with the driver so that the entire energy of the spring 7 is exerted through said connection directly upon the drum to wind up the cord 4 thereon. As the spring 7, when in high power connection with the drum 3, is calculated to exert a greater torque on the drum than does the elevating spring for the trolley pole through the cord 4 upon the drum, the cord 4 will be wound up on the drum and the trolley pole will be drawn down or retrieved until the two springs are in equilibrium.

13 indicates an accommodator provided with a hub $13^a$ rotatably mounted on the shaft 2.

13′ indicates a stud or pin formed on the accommodator.

14 indicates a locking pawl pivotally mounted on the stud 13′ and adapted to engage a ratchet wheel 15 fixed to the shaft 2.

14′ indicates a spring tending normally to press the pawl 14 into engagement with the ratchet 15. This spring is preferably coiled around the stud 13′ and one end thereof is fixed to the accommodator (a recess being formed therein to receive its free end), while its opposite end operatively engages the pawl, preferably upon a rear extension or tail thereof to be later described. 16 indicates a shifter or lock, rotatably mounted on the hub $13^a$ of the accommodator, and provided with oppositely arranged lugs $16^a$, $16^b$.

17 indicates a lock spring, preferably coil shaped and interposed between said shifter and the locking pawl 14, for controlling the operation of the latter in one direction, and in opposition to the spring 14′. One end of the spring 17 is connected at 17′ to the shifter or lock 16, and its opposite end at $17^a$ to the pawl 14.

18 indicates a stop or projection carried by the driver and projecting laterally from that face thereof adjacent to the drum into the path of the lug $16^a$ of the shifter 16 by which it is engaged as will be later described.

32 indicates an abutment or stop, preferably formed integrally on the accommodator, and arranged in the path of the lug $16^b$, by which it is engaged to limit the throw of the shifter 16, as will presently be described.

19, 19, indicate oppositely arranged dogs, pivoted at 19′, 19′, to the drum 3. One of the dogs is provided with a lug 20 while the other is provided with a stop 20′ to limit its outward movement.

21 indicates a rod, pivotally connected to each of the dogs to cause them to operate in unison.

$19^a$ indicates a spring operating to maintain the dogs 19 in a retracted position. This spring is preferably coiled about the adjacent stud 19′ for one of the dogs, one end thereof being bent into engagement with the drum web or spoke and its opposite end engaging with a lip or lug 19ᵃ' provided on the adjacent dog 19.

22 indicates a series of teeth formed on the inner peripheral surface of the driver 5 and arranged to be engaged by the lug 20 when the dogs are thrown outwardly under the action of centrifugal force.

When the trolley pole leaves the wire there is a sudden up-pull or jerk on the cord 4, due to the action of the trolley pole elevating spring. This sudden up-pull or jerk is responsible for an immediate increase of speed of rotation of the drum 3 in the rope unwinding or clockwise direction. This increased speed of rotation of the drum causes the free ends of the dogs 19 to move outwardly until the lug 20 engages one of the teeth 22 of the driver 5.

24 indicates a limiting dog pivoted at 24' to the retriever casing member 1ᵃ and provided with a rider 24ᵃ adapted to rest upon the outer surface of the spring 7 as clearly shown in Fig. 3.

24ᵇ indicates a spring for normally pressing the dog into engagement with the spring 7. This spring may be coiled around the pivot stud 24', one arm thereof being in engagement with the adjacent wall of the casing and its other arm bent to engage with and operate the dog 24.

25 indicates a wing preferably formed integral on the free end of the pawl 14, and provided with an inclined rear surface 25ᵃ. The wing 25 extends from one face of the pawl 14 and beyond its free end as will be clearly understood from Figs. 5 and 11. As will also be clear from Fig. 11, the accommodator and the parts carried thereby are arranged adjacent to the disk 5ᵃ of the driver 5 and relative to each other, so that when the pawl 14 is thrown outwardly, or away from the ratchet 15, its rear wall will engage the inner face of the circumferential wall 5ᵇ, and the wing 25 will project through the circumferential slot 5ᶜ.

26 indicates a combined depressor and stop pivotally mounted at 26' on the driver, and arranged in the slot 5ᶜ near the end wall 5ᵈ thereof. The depressor and stop is formed with an inclined surface, 26ᵃ.

26ᵇ indicates a spring, preferably coiled around the pivot 26', one end or arm engaging with the wall of the driver 5 and its opposite end or arm engaging the tail of the depressor or stop, tending to swing said depressor and stop inwardly.

26ᶜ is a projection on the depressor and stop 26 adapted both to ride a cam 13ᵇ formed on the accommodator, and, during the change from low to high power connections, engage the tail 14ᵃ on the lock pawl 14, thus operating as a trigger mechanism to positively move the said locking pawl. The projection 26ᶜ is preferably formed integral with the depressor and stop 26 and by its engagement with the cam 13ᵇ, limits the inward movement of the depressor under the action of the spring 26ᵇ.

27 indicates a thrust member carried by the accommodator and arranged to engage with a return spring 28. The spring 28 is carried by the driver and is preferably arranged behind a curved plate or wall 28' formed integral with the driver.

28ᵃ is an abutment for the spring 28. Preferably, one end of the plate or wall 28' operates as the stop 18 for the shifter lug 16ᵃ to hold the shifter 16 stationary when the drum connections are changed from low power connections to high power connections, as will be later described, while the opposite end of the wall or plate 28' forms a stop 29 for the shifter lug 16ᵇ when the drum connections are thrown from high power connections back to low power connections.

30 indicates an opening, and 30' a slot leading from said opening, formed in the periphery of the drum 3. The purpose of the opening 30 and slot 30' is to provide means for attaching the cord 4 to the drum 3. The cord is preferably tied into a knot 4' at or near its free end, which knot 4' is inserted through the opening 30. The cord 4 is then moved up into the slot 30' so that the knot 4' will engage the inner peripheral surface of the drum on opposite sides of the slot 30'. In order to provide for the quick and practically automatic detachment of the cord 4 from the drum 3 as it is continuously pulled for the purpose of unwinding and removing it from the drum, the inner peripheral surface of the drum 3 is inclined on the opposite sides of the slot 30' toward the opening 30, as shown at 31 (see Figs. 17 and 20). When the cord 4 is completely unwound off the drum 3, the knot 4' will readily slide down the inclines 31 by a further slight pull on the cord and pass out through the opening 30.

Fig. 5 shows the parts of the retriever in the position they occupy after they have been assembled, the spring 7 being entirely unwound, the lugs 16ᵃ and 16ᵇ of the lock member or shifter 16 being held between the stops 18 and 32 with the lock spring 17 compressed to hold the locking pawl 14 out of engagement with the ratchet 15, and the centrifugal dogs 19 being retracted. With the pawl 14 and dogs 19 in this position, the drum 3 and shaft 2 are free to rotate. The first step necessary to place the retriever mechanism in normal operative condition, with the drum connected with the power spring through the low power connections, is to attach the cord 4 to the drum 3 by inserting the cord knot 4' through the opening 30 and drawing it behind the slot 30'. The drum being free to rotate, it is manually turned in an anti-clockwise direction to wind a portion of the cord 4 thereon. To wind up the spring 7, the cord 4 is then given a sudden pull in the unwinding direction to rotate the drum in a clockwise direction and throw the centrifugal dogs 19 outwardly so that the lug 20 carried by one of them engages a tooth 22 of the driver 5. This operation connects the driver and drum together. Further pulling on the cord 4 and unwinding it off the drum 3 will operate to wind up the spring 7. The accommodator 13 and parts carried thereby move with the driver during the spring rewinding operation, such movement being due to the friction between the driver 5 and accommodator. As the rider 24ª on the limiting pawl 24 is yieldingly pressed against the outer convolution of the spring 7, it will be understood that when the spring 7 is unwound, the limiting pawl 24 is held out of the path of the wing 25 carried by the locking pawl 14, as the latter revolves with the driver. Winding of the spring causes it to contract or become smaller in over-all diameter; hence during the spring winding operating the rider 24ª follows the outer convolution of the spring and permits the pawl 24, under the influence of the spring 24ᵇ, to move inwardly and ultimately move into the path of and be engaged by the wing 25 of the locking pawl 14. Such engagement arrests the movement of the accommodator.

Fig. 6 illustrates the relation of parts during the winding up of the spring 7, and at the time when the limiting pawl 24 has moved inwardly and become engaged by the wing 25 of the pawl 14. The rotation of the driver 5 in the clockwise direction, by the unwinding of the cord off the drum, is continued until the low power connections are completed and the stop 26 engages the limit pawl 24. The several steps or positions of the parts, from the time the wing engages the pawl 24 (Fig. 6) until the drum is connected through the low power connections, are illustrated in Figs. 7, 8, 9, and 10, respectively. The first step in the operation is illustrated by the difference in position of the driver 5 and the parts carried thereby, the accommodator 13 and the shifter 16 in Figs. 6 and 7. In this latter figure, the return spring 28 is partially compressed by the thrust member 27, the stop and depressor has been operated by the cam 13ᵇ and the lug 29 has engaged the lug 16ᵇ and partially turned or shifted the shifter 16. During further rotation of the driver from the Fig. 7 to the Fig. 8 position the spring 28 is further compressed and the shifter further rotated on the hub of the accommodator 13, thus moving the end 17′ of spring 17 to the right side (as viewed in Figs. 5 to 10) of a line passing through the spring end 17ª and the axis of the shifter 16. As the shifter is free to rotate in a clockwise direction, it will be understood that when it has been operated sufficiently to move the spring end 17′ to the right of said line a slight distance, the spring will be free to expand, such expansion operating to rotate the shifter 16 into the position shown in Fig. 8 with the lug 16ᵇ out of contact with the lug 29. The spring 17 is now unlocked, and the pawl 14 free to be moved inwardly.

Fig. 8 illustrates the positions of the driver 5 and pawl 14 after the spring 17 has been unlocked but before the inward movement of the pawl 14, the depressor and stop 26 having moved into engagement with the back or inclined surface 25ª of the wing 25. Further continued rotation of the driver will, through the coöperation of the inclined surfaces 25ª and 26ª of the wing and stop, respectively, as the said stop is moved toward the pawl 24, positively depress or force the pawl 14 inwardly until it is free from the limiting pawl 24 and spring 14′, presses the locking pawl 14 into engagement with the teeth of the ratchet 15 carried by the shaft 2; also the stop 26 will engage the limiting pawl 24 and prevent further rotation of the driver and the unwinding of the rope, as shown in Fig. 9. Immediately following the release of the wing 25 from the pawl 24 and simultaneously during the inward movement of the pawl 14, the compression spring 28, acting on the thrust member 27, moves the accommodator 13, in a clockwise direction, around the shaft 2, relative to the driver, far enough to bring the lug 16ª into engagement with the lug 18 (see Fig. 9), the pawl 14 dropping into the teeth 15, when the accommodator comes to rest. This operation of the accommodator is for the purpose of positioning the shifter and particularly the lug 16ª thereof, in engagement with the stop 18 on the driver, so that in the setting of the lock spring 17 to be next described, the let-back of unwound cord, after the locking of the lock spring, will be a minimum. Next the pull on the cord 4 is relaxed and the driver under the action of spring 7 is rotated in anti-clockwise direction looking at the parts as shown in Fig. 9. The locking pawl 14 engages one of the teeth on the ratchet 15 and the stop or abutment 18 on the driver engages the arm 16ª of the shifter and turns the shifter in anti-clockwise direction, so as to move the lock spring 17 into its compressed position, in which it normally acts to throw the free end of the locking pawl away from the ratchet 15. Next the abutment 18 on the driver comes into engagement with the shoulder 13ᵈ on the accommodator and instantly the power is transmitted from the power spring 7, through the driver, accommodator, locking pawl, ratchet, shaft 2 and gearing connections to the drum 3. With these parts in this position and transmitting the tension of the power spring 7 to the drum, the lock spring 17 will be ineffective to operate the pawl 14. At the instant the driver engages with the accommodator, the pressure between the lug 20 carried by a centrifugal dog 19 and the driver is relieved, and as the drum now moves in the ratio of sixteen to one to the driver, the pressure on the lug 20 is quickly released, and the dogs 19, 19, under the action of the spring 19$^a$, are drawn into retracted position. The relative position of the parts just described is shown in Fig. 10.

When the shifter 16 is operated by the stop 18, the arm 16$^b$ engages with the stop 32, the effect of which is to arrest the movement of said shifter. As the driver is rotated in anticlockwise direction relative to the accommodator, the shoulder or lug 26$^c$ on the stop and depressor 26 rides around on the outer edge of the locking pawl 14 until it frees the tail 14$^a$ of the said pawl, and under the action of the spring 26$^b$, drops under and into the path of the tail of the locking pawl 14. At the same time the projection 26$^a$ of the depressor is forced out of the path of the limiting pawl 24.

Fig. 10 illustrates the relative positions of the parts when the trolley pole is running on the trolley or conductor wire, the force of the power spring 7 being geared down sufficiently to absorb only the slack in the cord 4 as the trolley pole moves up and down relative to the top of the car. In case the trolley pole leaves the trolley wire, the trolley pole carrier springs or elevating mechanism force the free end of the trolley pole upwardly so as to impart a sudden rotative movement to the drum 3 in the unwinding direction. This sudden rotative movement of the drum 3 will operate to throw the dogs 19 outwardly under the influence of centrifugal force, and connect the drum directly with the driver 5 by means of the lug 20, carried by one of the dogs, engaging with a driver tooth 22. The inertia of the parts set in motion thereby is sufficient to momentarily overcome the effort of the spring 7 to turn the driver in rope-winding direction, so that momentarily the pressure between the locking pawl 14 and the tooth on the ratchet 15 with which it has been in engagement, is relieved, whereupon the locking spring 17 acts to throw the nose of the locking pawl out of engagement with said ratchet tooth. To insure the operation of the spring 17 at this time, the relation of the lug 26$^c$ on the depressor 26 and the tail 14$^a$ of the locking pawl is such, that during the movement of the driver relative to the locking pawl 14 and against the action of the spring 7, the said lug 26$^c$ will engage the said tail 14$^a$ and impart a sudden kick or blow to the locking pawl, directed in clockwise direction, making it certain that the engagement between the locking pawl and ratchet will be relieved or broken sufficiently to insure the action of the spring 17 to throw the locking pawl out of engagement with the ratchet. The aforementioned inertia overcome, the power spring 7 immediately acts directly through the driver, centrifugal dogs 19 with lug 20, and drum to wind up the rope under the full power of the spring, which should exert a proportionately greater effort on the rope 4 than the effort exerted thereon by the trolley pole elevating mechanism on the car, in order to insure the practically instant drawing down of the trolley pole beneath the trolley wire or overhead conductor. It will be noted that the shock or jar on the various parts incident to the throwing of the spring 7 into direct high power connection with the drum, is absorbed by the said spring.

The parts above described, when the pole has been retrieved, occupy substantially the same position as that illustrated in Fig. 5, except that the dogs 19 are in their expanded position, one of them being in engagement with the driver. To change the connection again for drum 3 from high to low power connections, the cord 4 is unwound therefrom in the same manner as has already been described in first winding up the power spring 7.

It is sometimes desirable or necessary to disconnect the trolley cord 4 from the retriever. I provide means for such disconnection without the necessity of unwinding the spring or dismantling the parts. Such means comprise a plate 33 pivotally mounted on the drum 3, and arranged directly over the opening 30 therein on its inner periphery. The plate 33 is preferably pivoted on a shaft 33$^a$, the opposite ends of which are suitably mounted in two members 33$^b$, 33$^c$ which constitute the web of the drum 3.

33' indicates a spring, preferably coiled around the pivot pin for the plate 33 and having one end in engagement with the hub of the drum 3, while its opposite end engages with and operates to swing the said plate outwardly into contact with the inner periphery of the drum.

34 indicates a tooth engaging member or device carried by the plate 33 and arranged to extend laterally therefrom through a curved slot 33$^d$, formed in the drum web member 33$^b$, so that when said plate is in normal position against the inner periphery of the drum, the tooth engaging member 34 lies in the path of the teeth 22 carried by the driver 5, and serving by its engagement with a tooth 22 to lock the drum 3 against rotation relative to the driver. When the cord is first attached to the drum, the insertion of the knot 4' through the opening 30 will move the plate 33 inwardly against the tension of the spring 33' and hold the tooth engaging member or device 34 out of the path of the teeth 22. When the cord 4 is detached from the drum 3, the removal of the knot 4' through the opening 30 permits the plate 33 to move outwardly on its pivot so that the tooth engaging member or device 34 will engage a tooth 22. The drum 3 being connected through the low power connections with the power spring 7 rotates faster than the driver, as has been already described Under these circumstances, it will be understood that by throwing in the tooth engaging member or device 34 between the drum 3 and driver 5 and preventing differential movement between these parts, both of them will be locked against rotation and thus prevent the unwinding of the power spring. The insertion of the cord knot 4' through opening 30 will release the lock and place the retriever mechanism again in operative condition under the tension of the spring 7.

To those skilled in the art of making apparatus of the class described, many alterations in construction and widely differing embodiments and applications of my invention will suggest themselves without departing from the spirit and scope thereof. My disclosures and description herein, are purely illustrative and are not intended to be in any sense limiting.

What I claim is:—

1. In a trolley retriever, the combination of a rope winding drum, a driver, a power spring connected with said driver and continuously exerting its power to rotate said driver, two lines of power connections arranged to be alternately connected in between said drum and driver, one of said lines of power connections including an accommodator movable relative to said driver, means for changing said lines of power connections from one to the other, and means for moving the said accommodator relative to the driver when one of the lines of connections is connected in.

2. In a trolley retriever, the combination of a rope winding drum, a driver, a power spring connected with said driver and continuously exerting its power to rotate said driver, two lines of power connections arranged to be alternately connected in between said drum and driver, one of said lines of power connections including an accommodator movable relative to said driver, means for changing said lines of power connections from one to the other, the said accommodator being provided with a thrust member, and means engaging with the thrust member for moving the said accommodator relative to the driver when one of the lines of connections is connected in.

3. In a trolley retriever, the combination of a rope winding drum, a driver, a power spring connected with said driver and continuously exerting its power to rotate said driver, two lines of power connections arranged to be alternately connected in between said drum and driver, one of said lines of power connections including an accommodator movable relative to said driver, means for changing said lines of power connections from one to the other, the said accommodator being provided with a thrust member, and a compression spring engaging with the thrust member for moving the said accommodator relative to the driver when one of the lines of connections is connected in.

4. In a trolley retriever, the combination of a rope winding drum, a driver, a power spring connected with said driver and continuously exerting its power to rotate said driver, two lines of power connections arranged to be alternately connected in between said drum and driver, one of said lines of power connections including an accommodator movable relative to said driver, means for changing said lines of power connections from one to the other, the said accommodator being provided with a thrust member, and a compression spring mounted on the driver and engageable with the thrust member for moving the said accommodator relative to the driver when one of the lines of connections is connected in.

5. In a trolley retriever, the combination of a winding drum, a power spring, two different lines of power connections between said spring and drum, and coöperating trigger mechanism for automatically cutting out one of said lines of power connections between the said spring and drum when the other line of power connections is thrown in.

6. In a trolley retriever, a winding drum, a power spring, a driver connected with the spring, two different lines of power connections between said driver and drum, and coöperating trigger mechanism for cutting out one of said lines of power connections between the driver and drum when the other line of power connections is thrown in.

7. In a trolley retriever, the combination of a drum, a power spring, a rotatable driver connected with said spring, differential gear connections between said shaft and drum, connections between said shaft and driver, separate connections adapted to be connected between the said driver and the drum, and coöperating trigger mechanism for throwing out the connections between the shaft and driver when the separate connections between the driver and the drum are thrown in.

8. In a trolley retriever, the combination of a winding drum for a trolley rope, a rotatable driver, a power spring arranged to continuously exert its power to rotate said driver, low power connections arranged to be operatively connected between said driver and said drum, high power connections arranged to be operatively connected between said driver and drum, and means, including a coöperating trigger mechanism, for automatically disconnecting the drum from the driver through the low power connections when the high power connections are connected in between said driver and drum.

9. In a trolley retriever, the combination of a cord winding drum, a driver, a single actuating spring arranged to continuously exert its power to rotate said driver, differential gear connections between said drum and said driver, and means including a trigger mechanism for disconnecting the differential gear connections between the drum and driver.

10. In a trolley retriever, the combination of a winding drum, a single power spring, two separate lines of power connections between said drum and said spring, one of said lines of connections adapted to be used when the parts are in normal relation and the other adapted to be used when the retrieving of the trolley occurs, and means including a coöperating trigger mechanism for throwing out one line of connections when the other line of connections is connected in between said drum and spring.

11. In a trolley retriever, the combination of a winding drum for a trolley cord, a single actuating power spring for rotating the said drum, separate high and low power connections between said drum and spring, and means, including a coöperating trigger mechanism, for throwing out the low power connections when the high power connections are thrown in and for throwing in the said low power connections when the said high power connections are to be thrown out.

12. In a trolley retriever, the combination of a rope winding drum, an actuating spring, low power connections between said drum and spring, high power connections between said drum and spring permitting winding up of said spring by the rotation of the drum in the rope unwinding direction, means for throwing in said low power connections, and means, including a coöperating trigger mechanism, for throwing out said low power connections when the trolley leaves the trolley wire.

13. A trolley cord adapted to be connected at its upper end to a trolley, in combination with a trolley retriever having a power spring, a winding drum, to which the said trolley cord is connected, two lines of operating connections between said drum and said power spring, and means, including a coöperating trigger mechanism, adapted to automatically cut out one of said lines of connections when the other line of connections is thrown in.

14. In a trolley retriever, the combination of a winding drum, a rotatable driver, a power spring arranged to continuously exert its force to rotate the said driver, low power connections arranged to operatively connect the said drum and driver, the said connections including a locking pawl, high power connections arranged to operatively connect the said drum with said driver, when the low power connections between the drum and driver are thrown out, and means for positively operating the said locking pawl.

15. In a trolley retriever, the combination of a winding drum, a rotatable driver, a power spring arranged to continuously exert its force to rotate the said driver, low power connections arranged to operatively connect the said drum and driver, the said connections including a locking pawl, high power connections arranged to operatively connect the said drum with said driver, when the low power connections between the drum and driver are thrown out, and means carried by the driver for positively operating the said locking pawl.

16. In a trolley retriever, the combination of a winding drum, a rotatable driver, a power spring arranged to continuously exert its force to rotate the said driver, low power connections arranged to operatively connect the said drum and driver, the said low power connections including a locking pawl, high power connections arranged to operatively connect the said drum with said driver, when the low power connections between the drum and driver are thrown out, and means carried by the locking pawl and the driver for positively operating the said locking pawl.

17. In a trolley retriever, the combination of a winding drum, a rotatable driver, a power spring arranged to continuously exert its force to rotate the said driver, low power connections arranged to operatively connect the said drum and driver, the said low power connections including a locking pawl, high power connections arranged to operatively connect the said drum with said driver, when the low power connections between the drum and driver are thrown out, the said locking pawl being provided with a tail piece, and means engaging said tail piece for operating the said locking pawl.

18. In a trolley retriever, the combination of a winding drum, a rotatable driver, a power spring arranged to continuously exert its force to rotate the said driver, low power connections arranged to operatively connect the said drum and driver, the said low power connections including a locking pawl, high power connections arranged to operatively connect the said drum with said driver, when the low power connections between the drum and driver are thrown out, the said locking pawl being provided with a tail piece, and means carried by the driver and engaging with the said tail piece for operating the said locking pawl.

19. In a trolley retriever, the combination of a winding drum, a rotatable driver, a power spring arranged to continuously exert its force to rotate the said driver, low power connections arranged to operatively connect the said drum and driver, the said low power connections including a locking pawl, high power connections arranged to operatively connect the said drum with said driver, when the low power connections between the drum and driver are thrown out, means for operating said pawl in one direction to throw out the low power connections between the said drum and driver, the said locking pawl being provided with a wing, and means for engaging directly with the said wing returning the said locking pawl to its first position when the low power connections are thrown in.

20. In a trolley retriever, the combination of a casing, a winding drum mounted therein, a driver, two separate lines of power connections between said drum and driver, means for throwing out one of said lines of power connections when the other of said lines is thrown in, one of said lines of power connections including a locking pawl arranged to move in one direction to throw out the said line of connections, and means carried by said casing and said driver engaging said pawl for moving it in the opposite direction to throw in said line of connections.

21. In a trolley retriever, the combination of a casing, a winding drum mounted therein, a driver, a power spring arranged to exert its force to continuously rotate the said driver, two lines of power connections between said drum and driver, coöperating means for throwing out one of said lines of power connections and throwing in the other of said lines, one of said lines of power connections including a locking pawl arranged to move in one direction when said line of connections is thrown out, a wing carried by said pawl, and a pair of pawls carried by the casing and driver, respectively, arranged to engage said wing for moving said locking pawl in the opposite direction when said line of connections is thrown in.

22. In a trolley retriever, the combination of a winding drum, a driver, a single actuating spring connected to and operating to rotate said driver in one direction, two lines of power connections between said drum and driver, means for throwing out one of said lines of connections between said drum and driver when the other of said lines is thrown in, and vice versa, one of said lines of power connections including a locking pawl, and means engaging with said pawl on one side of its pivot to move it in one direction to throw out the said line of connections and engaging with said locking pawl on the opposite side of its pivot to move it in the opposite direction to throw in the said line of connections.

23. In a trolley retriever, the combination of a shaft, a winding drum loosely mounted on said shaft, a driver mounted on said shaft, a single actuating spring connected to and operating to rotate said driver in one direction, differential gear mechanism between said shaft and drum, a line of power connections arranged to connect said drum and driver together, a locking pawl between said shaft and driver and arranged to be disconnected from the shaft when the line of power connections is thrown in, and means for operating said locking pawl arranged to engage therewith on one side of its pivot to move it in one direction to disconnect it from said shaft and to engage therewith upon the opposite side of its pivot for moving it in the opposite direction to connect it to said shaft.

24. In a trolley retriever, the combination of a shaft, a winding drum loosely mounted on said shaft, a driver mounted on said shaft, a single actuating spring connected to and operating to rotate said driver in one direction, differential gear mechanism between said shaft and drum, a line of power connections arranged to connect said drum and driver together, a locking pawl between said shaft and driver and arranged to be disconnected from the shaft when the line of power connections is thrown in, and means carried by said driver for operating said locking pawl arranged to engage therewith on one side of its pivot to move it in one direction to disconnect it from said shaft and to engage therewith upon the opposite side of its pivot for moving it in the opposite direction to connect it to said shaft.

25. In a trolley retriever, the combination with a support of a shaft, a driver mounted on the shaft, a power spring arranged to exert its force to rotate the driver, a winding drum, gearing between the drum and shaft, connections between the driver and shaft including a spring controlled locking pawl, separate connections arranged to be connected directly between the driver and drum, coöperating means for throwing out the first mentioned connections when the last mentioned connections are thrown in and means engaging directly with the locking pawl for resetting the connections between the driver and shaft.

26. In a trolley retriever, the combination of a power spring, a driver operatively connected with the said spring, a winding drum, low power connections, including a locking pawl, between said driver and drum, high power connections arranged to be operatively connected in between said drum and driver, means for operating said locking pawl to throw out the low power connections when the high power connections are thrown in, and means, including a depressor, engaging directly with the locking pawl for throwing in said low power connections.

27. In a trolley retriever, the combination of a power spring, a driver operatively connected with the said spring, a winding drum, low power connections between said drum and driver, the said power connections including a locking pawl, high power connections arranged to be operatively connected in between said drum and driver, means for operating said locking pawl to throw out the low power connections when the high power connections are connected in, and means, including a combined depressor and stop, engaging directly with the locking pawl for throwing in said low power connections and for limiting the winding up of said spring.

28. In a trolley retriever, the combination with a casing, of a winding drum, a spring operated driver, low and high power connections between said driver and said drum, the said low power connections including a locking pawl, and coöperating means for alternately throwing in and out said low and high power connections, the said means including a device carried by the casing and arranged to engage directly with said pawl.

29. In a trolley retriever, the combination of a winding drum, a spring operated driver, low and high power connections between the driver and the drum, the said low power connections including a locking pawl provided with a wing, and mechanism for alternately throwing in and out said low and high power connections between said drum and driver, the said mechanism including means engaging directly with the wing of the said locking pawl and means pivoted to the driver and coöperating with the said pawl engaging means for automatically resetting the said pawl when said low power connections are thrown in.

30. In a trolley retriever, the combination of a rotatable winding drum, a spring, a driver connected with said spring, high and low power connections between said driver and drum, means for alternately connecting and disconnecting said high and low power connections between said drum and driver, the said low power connections including an accommodator and a locking pawl carried thereby, means engaging with said locking pawl for holding the accommodator stationary during the connecting of the low power connections between said drum and driver, and means carried by the driver coöperating with the said pawl engaging means to first set the locking pawl and then to limit the rotation of the driver in the spring-winding direction, the said accommodator being provided with means for moving the coöperating pawl engaging means into operative position.

31. In a trolley safety device, the combination with a cord adapted to be connected with the trolley pole at one end, the opposite end of the cord being enlarged or knotted, of a drum, on which the cord is wound, provided with an opening to permit connection and disconnection of the enlarged or knotted end of the cord thereto, the said drum being provided with guide means to cause automatic disconnection of the rope therefrom by a pull on the cord.

32. In a trolley safety device, the combination with a cord adapted to be connected with a trolley pole, of a drum on which the cord is wound, means for rotating the drum, and means operating by the disconnection of the cord from the drum to prevent the rotation thereof by the drum rotating means, the drum being provided with guides to cause the ready disconnection of the cord therefrom.

33. In a trolley safety device, the combination of a drum, provided with an opening and a branch slot leading from the opening, means for rotating the drum, a cord provided with an enlarged end arranged to enter the said opening and lie in the said slot and be connected with the drum, the inner wall of the drum on opposite sides of the slot being inclined toward its opening to cause the ready disconnection of the cord from the drum, and means controlled by the disconnection of the cord from the drum to prevent its rotation by said rotating means.

34. In a trolley safety device, the combination of a casing, a drum, a spring actuated driver, a line of low power connections between said drum and driver, a line of high power connections between said drum and driver, means for throwing out the low power connections when the high power connections are thrown in, the said low power connections including a locking pawl which is operated in one direction to throw out the said low power connections, and means carried by the casing and the driver engaging the said locking pawl for resetting it, to throw in the low power connections, by the continuous unwinding of the drum.

35. The combination of a rope winding drum, a driver provided with an abutment, a power spring for rotating said driver, two lines of power connections between said driver and drum arranged to be alternately connected in, one of said lines of connections including an accommodator provided with an abutment and arranged to move relative to said driver, means for causing movement of said accommodator relative to the driver in one direction, and a spring interposed between the abutment of the driver and the abutment of the accommodator for moving the accommodator in the opposite direction, the said spring being compressed automatically by the movement of the accommodator in the first mentioned direction.

36. The combination of a drum on which a trolley rope is adapted to be wound, a driver, a spring for rotating said driver, two lines of power connections between said driver and drum, one of said lines of connections including a pawl and a ratchet, a projecting member carried by said pawl, and means comprising a pair of coöperating members arranged to engage with said projecting member to automaticaly connect said pawl with said ratchet.

37. The combination of a drum on which a trolley rope is adapted to be wound, a driver, a spring for rotating said driver, two lines of power connections between said driver and drum, one of said lines of connections including a pawl and a ratchet, a projecting member carried by said pawl, and means comprising a pair of coöperating members arranged to engage with said projecting member to automatically connect said pawl with said ratchet, one of said members being controlled by the winding up of said power spring due to its contraction.

38. The combination of a drum on which a trolley rope is adapted to be wound, a driver, a spring for rotating said driver, two lines of power connections between said driver and drum, one of said lines of connections including an accommodator movable relative to said driver, a pawl and a ratchet, a projecting member carried by said pawl, and means comprising a pair of coöperating members arranged to engage with said projecting member to automatically connect said pawl with said ratchet, one of said members being controlled by said accommodator.

39. The combination of a drum on which a trolley rope is adapted to be wound, a driver, a spring for rotating said driver, two lines of power connections between said driver and drum, one of said lines of connections including an accommodator, a pawl and a ratchet, a projecting member carried by said pawl, and means comprising a pair of coöperating members arranged to engage with said projecting member to automatically connect said pawl with said ratchet, one of said members being carried by the driver and controlled by said accommodator.

40. The combination of a drum on which a trolley rope is adapted to be wound, a driver, a power spring connected with said driver for rotating it, a line of low power connections between said drum and driver, a line of high power connections between said drum and driver arranged to be connected in when the low power connections are disconnected, and operating to transmit power from said driver to the drum to wind the rope thereon and from said drum to said driver to re-wind the said spring, and means for automatically connecting in said low power connections during the re-winding of the spring, the said means including a device arranged to limit the winding up of the spring.

41. The combination of a drum on which a trolley rope is adapted to be wound, a driver, a power spring connected with said driver for rotating it, a line of low power connections, including an accommodator, between said drum and driver, a line of high power connections between said drum and driver arranged to be connected in when the low power connections are disconnected, and operating to transmit power from said driver to the drum to wind the rope thereon and from said drum to said driver to rewind the said spring, and means controlled by said accommodator for limiting the re-winding of said spring.

42. The combination of a drum on which a trolley rope is adapted to be wound, a driver, a power spring connected with said driver for rotating it, a line of low power connections, including an accommodator, between said drum and driver, a line of high power connections between said drum and driver arranged to be connected in when the low power connections are disconnected, and operating to transmit power from said driver to the drum to wind the rope thereon and from said drum to said driver to re-wind the said spring, and means carried by said driver and controlled by said accommodator for limiting the re-winding of said spring.

43. In a trolley retriever, the combination of a winding drum, a driver, a power spring connected to the driver, two different lines of power connections between said driver and drum arranged to be alternately connected therebetween, one of said lines of power connections including an accommodator movable relative to said driver, and thrust means for moving said accommodator when one of said lines of connections is cut out and the other line of connections is thrown in.

44. The combination of a drum on which a rope is adapted to be wound, a power spring, a member connected to and operated by said spring, two lines of power connections between said member and drum arranged to be alternately connected in to transmit power from one to the other, and means for changing said lines of connections, the said means being operated by the pull on the rope in the rope unwinding direction.

45. The combination of a drum on which a rope is adapted to be wound, a power spring, a member connected to and operated by said spring, two lines of power connections between said member and drum arranged to be alternately connected in to transmit power from one to the other, and means for connecting in and out one of said lines of connections, the said means being operated by the pull on the rope in the rope unwinding direction.

46. The combination of a drum on which a trolley rope is adapted to be wound, a spring, a member rotated thereby, a line of power connections arranged to be connected in and out between said member and drum and serving to keep the rope taut, a separate line of connections arranged to be connected in between said member and drum when the first mentioned line of connections is disconnected and operating to transmit power from said drum to said member to wind the spring, and means operated by pull on the rope in the unwinding direction for connecting in the first mentioned line of connections.

47. The combination of a drum on which a trolley rope is adapted to be wound, a driver, a power spring for rotating said driver, two lines of power connections arranged to be alternately connected in between said spring and drum, one of said lines of connections including a ratchet, a pawl arranged to engage and disengage the said ratchet and a movable accommodator on which the pawl is mounted, and a pair of coöperating devices for engaging said pawl with said ratchet to connect in said line of connections, the operation of one of said devices being controlled by the accommodator.

48. In a trolley retriever, the combination of a shaft, a winding drum loosely mounted thereon, a driver mounted on said shaft, a power spring arranged to exert its force to rotate the said driver, a line of power connections arranged to operatively connect said drum and driver, the said connections having a member movable relative to said driver and a pawl carried thereby, a separate line of power connections arranged to operatively connect said drum and driver when the first mentioned line of power connections is thrown out, and means actuated by the relative movement between said member and said driver for positively operating said pawl to throw out the first mentioned line of power connections.

49. In a trolley retriever, the combination with a trolley rope adapted to be connected at one end to a trolley, of a member adapted to rotate in opposite directions, means for rotating said member in one direction, a winding drum to which the other end of said rope is connected, a line of connections between said member and said drum for retrieving the trolley, the said line of connections being actuated by the sudden up-pull on the rope, a separate line of connections between said member and said drum for keeping said rope taut and constructed and arranged to be disconnected when the retrieving line of connections is thrown in, and means actuated by the pull on the rope in the unwinding direction for throwing in the last mentioned line of connections.

50. In a trolley retriever, the combination with a trolley rope adapted to be connected at one end to a trolley, of a member adapted to rotate in opposite directions, means for rotating said member in one direction, a winding drum to which the other end of said rope is connected, a line of connections between said member and said drum for retrieving the trolley, the said line of connections being actuated by the sudden up-pull of the rope, a separate line of connections between said member and said drum for keeping said rope taut and constructed and arranged to be disconnected when the retrieving line of connections is thrown in, and means for positively connecting in the last mentioned line of connections when the retrieving line of connections is thrown out.

51. The combination of a drum on which a trolley rope is adapted to be wound, a driver, a spring for rotating said driver, two lines of power connections arranged to be alternately connected in between said driver and drum, one of said lines including a centrifugal pawl and the other of said lines including a spring controlled pawl, and auxiliary means for actuating said spring controlled pawl in one direction.

52. The combination of a drum on which a trolley rope is adapted to be wound, a driver, a spring for rotating said driver, two lines of power connections arranged to be alternately connected in between said driver and drum, one of said lines including a centrifugal pawl and the other of said lines including a spring controlled pawl, and auxiliary means for actuating said spring controlled pawl in either direction.

53. The combination with a casing, of a drum on which a trolley rope is adapted to be wound, a driver, a spring for rotating said driver, two lines of power connections arranged to be alternately connected in between said driver and drum, one of said lines including a centrifugal pawl and the other of said lines including a spring controlled pawl, and auxiliary means carried by the casing and driver for actuating said spring controlled pawl.

54. In a trolley retriever, the combination of a spring, a driver connected to and operated by said spring, a drum on which a trolley rope is adapted to be wound, two lines of driving connections between said driver and said drum, said connections operating to transmit power from said drum to said driver to wind the said spring when the rope is unwound from the drum, and means, including an element connected to the driver, for limiting the winding of the spring when one of the lines of driving connections is connected in between said driver and drum.

55. In a trolley retriever, the combination of a spring, a driver connected to and operated by said spring, a drum on which a trolley rope is adapted to be wound, two lines of driving connections between said driver and said drum, said connections operating to transmit power from said drum to said driver to wind the said spring when the rope is unwound from the drum, and means for limiting the winding of the spring when one of the lines of driving connections is connected in between said driver and drum, the said limiting means being actuated by one of the lines of connections.

In testimony whereof I affix my signature in the presence of two witnesses.

MELVIN A. YEAKLEY.

Witnesses:
GRACE M. BELL,
A. M. McCARTY.

Copies of this patent may be obtained for five cents each, by addressing the "Commissioner of Patents, Washington, D. C."